United States Patent
Slowik et al.

(10) Patent No.: US 11,800,611 B2
(45) Date of Patent: Oct. 24, 2023

(54) ALGORITHMIC CONTROL OF LED CURRENT AND ON TIME FOR EYE SAFETY

(71) Applicant: ZEBRA TECHNOLOGIES CORPORATION, Lincolnshire, IL (US)

(72) Inventors: Joseph S. Slowik, Nesconset, NY (US); Erik Servili, Deer Park, NY (US); Igor Vinogradov, Oakdale, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/679,752

(22) Filed: Feb. 24, 2022

(65) Prior Publication Data

US 2023/0269843 A1 Aug. 24, 2023

(51) Int. Cl.
  *H05B 45/14* (2020.01)
  *H05B 45/30* (2020.01)
  *G06K 7/10* (2006.01)

(52) U.S. Cl.
  CPC ......... *H05B 45/14* (2020.01); *G06K 7/10732* (2013.01); *H05B 45/30* (2020.01)

(58) Field of Classification Search
  CPC ........ H05B 45/10; H05B 45/14; H05B 45/30; H05B 47/10; H05B 47/105; G06K 7/10732
  See application file for complete search history.

(56) References Cited

U.S. PATENT DOCUMENTS

| 2011/0115396 A1* | 5/2011 | Horvath | H05B 45/18 315/250 |
| 2020/0267810 A1* | 8/2020 | Chemel | H05B 47/11 |

OTHER PUBLICATIONS

International Search Report and Written Opinion for International Appiication No. PCT/US2023/13714 dated Mar. 29, 2023.

* cited by examiner

*Primary Examiner* — Thai Pham
(74) *Attorney, Agent, or Firm* — Yuri Astvatsaturov (57) ABSTRACT

A method and system for controlling illumination according to eye safety standards. The method includes a processor retrieving from a memory of an illumination module, device information indicative of properties of the illumination module. The device information includes a plurality of parameters of an illumination element of the illumination module, and a maximum constant for the illumination element. The maximum constant is associated with a desired eye safety standard and is also indicative of a relationship between at least two parameters of the illumination element. The method further includes receiving, from a user, a desired parameter value for one of the parameters of the plurality of parameters. The processor determines a test constant from the desired parameter value, and the processor compares the test constant and maximum constant to determine if the desired parameter value is an acceptable value.

21 Claims, 5 Drawing Sheets

ALGORITHMIC CONTROL OF LED CURRENT AND ON TIME FOR EYE SAFETY

BACKGROUND

Typical barcode readers and machine vision systems, such as handheld barcode readers, point of sale scanners, and direct part marking scanners, require proper illumination of targets to obtain high quality, low-blur images to decode barcodes in the images. The illumination source is essential for decoding of barcodes in captured images and various factors such as time of day, direction of illumination, illumination intensity, light color, and light type or light source type all effect how effective a system may be in decoding barcodes. Additionally, the type of barcode, the reflectivity of a target, and the distance or size of a target are also all important factors in decoding barcodes in captured images, each type of which may require a different type of illumination.

Maintaining eye safe illumination and operation is important for illumination systems. Different illumination system manufacturers may want their systems to operate within a given risk group according to eye safety standards. Maintaining eye safe operation across multiple systems can be complicated as different light sources (e.g., LED, laser diode, etc) each have different eye safety risks and standards dependent on factors such as light coherence and spectrum. Further, each color of illumination has different risk factors which further complicates systems that maintain eye safety across various colors of LEDs or multicolor illumination sources. For example, an illumination system with blue LEDs generally pose a higher risk to causing damage to the eye, while a green or red LED in the same illumination system may be operated within eye safety standards given same electrical currents and output illumination levels. As such, it could be beneficial for an illumination system to operate within desired eye safety standards by controlling individual light sources to maintain overall system compliance with eye safety standards during operation.

SUMMARY

In an embodiment, the present invention is a method for controlling illumination according to desired eye safety standards. The method includes retrieving, by a processor and from a memory of an illumination module, device information indicative of properties of the illumination module, wherein the device information includes (i) a plurality of parameters of an illumination element of the illumination module and (ii) a maximum constant for the illumination element, the maximum constant indicative of a relationship between at least two parameters of the illumination element. The method further includes receiving, from a user, a desired parameter value for one of the parameters of the plurality of parameters. The processor determines a test constant from the desired parameter value, and then determines from the test constant and maximum constant, if the desired parameter value is an acceptable parameter value.

In a variation of the current embodiment, the maximum constant is indicative of a proportional relationship between an electrical current of the illumination element, and an output illumination provided by the illumination element, and wherein the test constant is indicative of one of (i) a desired electrical current of the illumination element, or (ii) an output illumination provided by the illumination element.

In another variation of the current embodiment, determining that the desired parameter value is an acceptable parameter value comprises: comparing, by the processor, the test constant and the maximum constant; and determining, by the processor, that the desired parameter value is an acceptable parameter value if the test constant is equal to or less than the maximum constant, or that the desired parameter value is not an acceptable parameter value if the test constant is greater than the maximum constant.

In another embodiment, the present invention is an illumination system comprising an illumination port adapted to receive an illumination module having (i) one or more illumination elements, and (ii) a memory storing device information indicative of the illumination module. The device information includes (i) a plurality of parameters of an illumination element of the illumination module and (ii) a maximum constant for the illumination element, the maximum constant being indicative of a relationship between at least two parameters of the illumination element. The system further comprises at least one processor operatively connected to the illumination port, the processor configured to: retrieve the device information from the memory of the illumination module; receive, at a user interface, a desired parameter value for one of the parameters of the plurality of parameters; determine a test constant from the desired parameter value; and determine, from the test constant and maximum constant, that the desired parameter value is an acceptable parameter value.

In a variation of the current embodiment, the illumination module is selectively removable from the illumination system.

In another variation of the current embodiment, the maximum constant is indicative of a proportional relationship between an electrical current of the illumination element, and an output illumination provided by the illumination element, and wherein the test constant is indicative of one of (i) a desired electrical current of the illumination element, or (ii) an output illumination provided by the illumination element.

In yet another variation of the current embodiment, to determine that the desired parameter value is an acceptable parameter value the processor is further configured to: compare the test constant and the maximum constant; and determine that the desired parameter value is an acceptable parameter value if the test constant is equal to or less than the maximum constant, or that the desired parameter value is not an acceptable parameter value if the test constant is greater than the maximum constant.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Scanning systems require proper illumination of targets to decode targets of different types. Illumination systems may be designed to illuminate specific targets having specific properties. For example, one illumination system may be used to illuminate and scan targets within a narrow field of view at distances far from a scanning system, while another illumination system may be used for scanning targets at a close range to the scanning system in a wider field of view. As such it may be desirable for a system to include a modular illumination system that attaches to an illumination port or illumination bay allowing for changing an illumination module based on a type, or types of targets for scanning.

Illumination systems employ various illumination sources, such as LEDs, of various colors and having varied electrical current and power specifications. Additionally, different light sources, including any focusing of dispersive optics coupled thereto, must meet eye safety standards for safe operation of the illumination system. A system and method for determining eye safe operation for a given illumination module is described. The methods also include automatic control of electrical current and on/off times of individual illumination sources to allow for eye safe operation for a wide range of illumination modules that employ one or more illumination sources.

Figure 1:
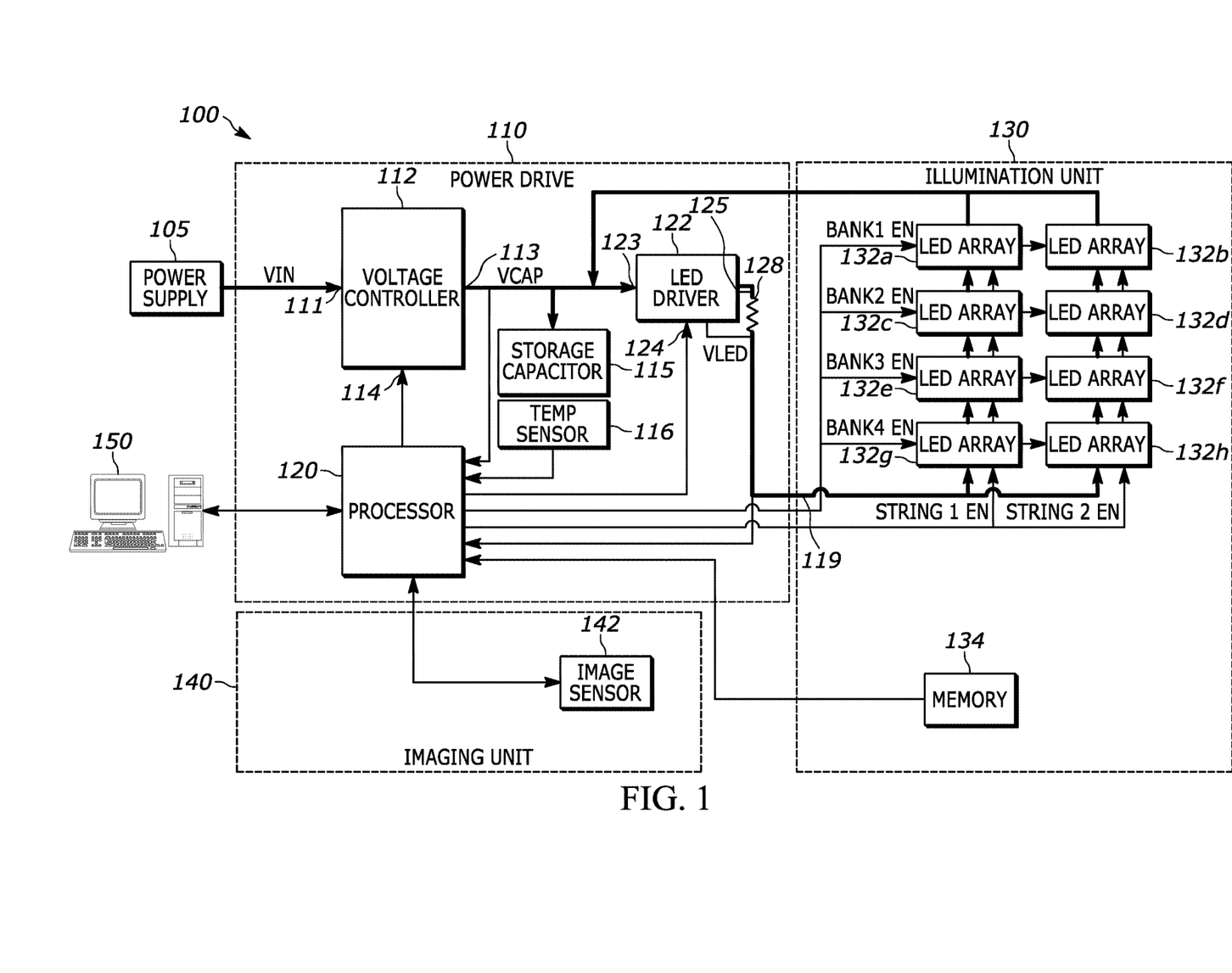
FIG. 1 illustrates an example illumination system that implements the eye safety illumination techniques disclosed herein.

FIG. 1 illustrates an example illumination system 100 that implements the eye safety illumination techniques described herein. In FIG. 1, the current supply path for the illumination unit is depicted in thicker lines, whereas the control connections are depicted in thinner lines. The illumination system 100 may be implemented in an industrial environment. For example, the illumination system 100 may be implemented in an assembly line to detect barcodes placed on parts and/or to detect defects on parts. As illustrated, there are three main components of the illumination system 100: an imaging unit 140 configured to capture image data; an illumination unit 130 for providing illumination light to facilitate the capture of image data; and a power driver 110 configured to provide power to the illumination unit 130.

Starting with the imaging unit 140, the imaging unit 140 may include a camera or a wide angle camera and include any known imaging components for capturing image data. For example, the imaging unit 140 may include an array of image sensors 142 configured to detect reflections of light that pass through a lens system. In some embodiments, the imaging unit 140 includes one or more filters configured to filter the reflected light before and/or after it is sensed by the image sensors 142.

Turning to the illumination unit 130, the illumination unit 130 includes one or more LEDs 132 and a memory 134. In the illustrated embodiment, the illumination unit 130 includes four banks of LEDs 132 separated into two groupings 132*a-h* each. Each of the banks may include a switch associated therewith to controllably prevent current from flowing to the respective LEDs 132 within the bank. For example, a switch associated with bank 1 may block current from flowing into LEDs groupings 132*a* and 132*b*. Similarly, each of the groupings of LEDs may be associated with a switch to controllably cause the current flowing into the LED bank to bypass the LED grouping 132*a-h*. It should be appreciated that the switches need not be physical switches, such as relays, but may instead be electrical switches implemented via a transistor. Further, the switches may include elements that control an amount of current that is provided to each LED grouping 132*a-h* to control an amount of illumination provided by corresponding LEDs of LED groupings 132*a-h*.

The memory 134 of the illumination unit 130 may be configured to store various information about the LEDs 132 or LED properties. For example, the memory 134 may store a category voltage for the LEDs 132, a category current for the LEDs 132, a category temperature for the LEDs 132, a number of LEDs 132, an LED color for the LEDs 132, an LED binning for the LEDs 132, an LED grouping arrangement (e.g., a logical positioning of the LEDs 132 in terms of bank and group numbering), a physical arrangement (e.g., a physical location of the LEDs 132 on the illumination unit 130), relative locations of the LEDs 132 to each other, an LED part number, a physical position and/or orientation of one or more of the LEDs on a circuit board, an eye safe current each of the LEDs 132, an eye safe power to provide to each of the LEDs 132, an eye safe illumination output of each of the LEDs 132, a model number for the illumination unit 130, and/or other information about the illumination unit 130 and/or the LEDs 132.

The memory 134 of the illumination unit 130 may store a maximum parameter for one or more of the LEDs, or other illumination elements of the illumination module 130. The maximum parameter is indicative of one or more maximum values for parameters of the LEDs 132. The maximum parameter may be indicative of a maximum current that may be provided to one or more of the LEDs 132, a maximum illumination output of one or more of the LEDs 132, an amount of time that one or more of the LEDs 132 may provide illumination according to eye safety standards. As will be discussed in further detail below, the maximum parameter may be indicative of a proportional relationship between one or more of the previously described LED parameters or properties, and/or properties of the illumination unit. For example, the maximum parameter may be a value that is indicative of a direct or indirect proportional relationship between an eye safe current for an LED, and an eye safe amount of illumination time for an LED.

In the illustrated example, the illumination unit 130 is connected to the power drive 110 via an illumination port 119. While FIG. 1 depicts the current supply to the LEDs 132 and the logical connection to the memory 134 occurring at different points, in some embodiments, both connections may be included in a single connector (e.g., a parallel port connector). It should be appreciated that in some embodiments, the banks that form the illumination unit 130 may be separate illumination boards. In some implementations of this embodiment, the illumination port 119 may be configured to receive a connector associated with each illumination board. In other implementations, each illumination board includes two connectors for stacking and/or daisy chaining the illumination boards onto one another. In these implementations, the illumination port 119 may be configured to receive the connector from the closest illumination board, which in turn, receives the connector from the next closest illumination board, and so on. Additionally, it should be understood that illumination boards are readily interchangeable and may be removed from the illumination unit 130, to connect one or more other illumination boards to the illumination unit 130.

Turning to the power driver 110, the power drive 110 includes a processor 120 configured to adaptively control operation of the illumination system 100. The processor 120 may be a microprocessor and/or other types of logic circuits. For example, the processor 120 may be a field programmable gate array (FPGA) or an application specific integrated circuits (ASIC). Accordingly, the processor 120 may be capable of executing instructions to, for example, implement operations of the example methods described herein, as may be represented by the flowcharts of the drawings that accompany this description. The machine-readable instructions may be stored in the memory (e.g., volatile memory, non-volatile memory) of the processor 120 and corresponding to, for example, the operations represented by the flowcharts of this disclosure and/or operation of the illumination unit 130 and/or the imaging unit 140.

For example, the processor 120 may be configured to control operation of the switches of the illumination unit 130. To this end, control for the LED bank switches and control of the LED grouping switches may be multiplexed onto respective control lines connected to general purpose input/output (GPIO) ports of the processor 120. Accordingly, the processor 120 is able to set the control state for the switches of the illumination unit 130 by transmit control instructions via the respective GPIO port.

The example power drive 110 also includes a voltage controller 112 configured to boost an input voltage at a power input port 111 to a programmable output voltage supplied to a voltage output port 113. In some embodiments, the voltage controller 112 is a DC-DC buck/boost voltage converter. Accordingly, the voltage controller 112 includes one or more input ports 114 via which the processor 120 controls operation of the voltage controller 112. For example, one of the input ports 114 may be an output voltage control via which the processor 120 sets the output voltage supplied to the voltage output port 113. The processor 120 may determine a minimum capacitor voltage needed to recharge a storage capacitor 115 to a charge level that meets a power requirement for operation of the LEDs 132 of the illumination unit 130 during an illumination cycle. Accordingly, the processor 120 may be configured to set the output voltage to this determined minimum capacitor voltage level. The processor 120 may control the voltage controller 112 so that the voltage controller 112 provides a specific voltage, current, or electrical power to each LED 132. The processor 112 may control the voltage controller 112 to provide electrical power, in the form of a voltage and/or current, to each LED 132 to provide eye safe illumination from the illumination unit 130.

As another example, one of the input ports 114 may correspond to a current-limiter port via which the processor 120 sets a maximum current flowing into the voltage controller 112. To this end, a power supply 105 connected to the power input port 111 may be associated with a maximum current rating. For example, if the power supply 105 is a universal serial bus (USB) power supply, the maximum current may be 500 mA, 900 mA, 1.5A, or 3A depending on the USB version implemented. The processor 120 may control the current flowing into the voltage controller 112 according to eye safety operational standards for the LEDs 132 and the illumination unit.

The storage capacitor 115 is configured to store charge for powering illumination cycles and/or pulses thereof executed by the illumination unit 130. While FIG. 1 depicts the storage capacitor 115 as a single capacitor, the storage capacitor 115 may be a bank of capacitors connected in series and/or parallel with one another. The example illumination unit 130 is configured to draw power from the capacitor 115 (via an LED driver 122). The example storage capacitor 115 is connected to the output port 113 of the voltage controller 112 such that the boosted voltage drawn from the power supply 105 is used to recharge the storage capacitor 115. To this end, the minimum capacitor voltage determined by processor 120 may correspond to the minimum voltage level to recharge the storage capacitor 115 to a voltage level sufficient to power a subsequent illumination cycle and/or pulse thereof. Accordingly, the storage capacitor 115 is subjected to the minimum voltage required for operation of the illumination unit 130, thereby extending the life of the storage capacitor 115. The voltage supplied to the storage capacitor 115 may be controlled to only provide the LEDs 132 with an amount of current or electrical power to provide eye safe illumination from the illumination unit 130. The capacitor 115 may be controlled to limit the amount of time that the capacitor 115 provides power to the LEDs 132 to keep illumination pulses within an eye safe time window.

The example LED driver 122 is configured to draw power from the storage capacitor 115 connected at a voltage input port 123 and boost the capacitor voltage to a voltage level that supplies a current set point value at a current output port 125. To this end, the LED driver 122 may include an input port 124 via which the processor 120 sets the current set point value of the LED driver 122. As illustrated, the current output port 125 is connected to the illumination port 119 to provide power to the illumination unit 130.

In the illustrated example, to detect the output current at the current output port 125, the LED driver 122 may be connected to a sense resistor 128 having a known resistance. To this end, the LED driver 122 may include ports operatively connected on either side of the sense resistor 128. Thus, the LED driver 122 is able to determine a voltage drop across the sense resistor 128 for comparison to the known resistance of the sense resistor 128 to determine the output current. The LED driver 122 may then ramp up the voltage supplied to the current output port 125 until the output current reaches the current set point programmed by the processor 120, for providing illumination according to eye safety standards.

It should be appreciated that during operation, the voltage drop of the LEDs 132 changes due to different illumination needs. Thus, the voltage boost requirement for proper operation of the LEDs changes as well. Because traditional power drives for illumination assemblies supply a fixed voltage, traditional power drives always provides a worse case voltage level causing heat dissipation when less voltage is needed. Instead, the adaptive power drive techniques described herein control the power supplied to the LEDs 132 based on a current requirement, and eye safety standards as required. Thus, the LED driver 122 adaptively adjusts the voltage supplied to the LEDs (via the illumination port 119) based on actual operation of the LEDs and a desired level of eye safety standards.

The processor 120 is also connected to a temperature sensor 116 configured to sense a temperature of the storage capacitor 115. Based on the sensed temperature, the processor 120 may adjust the determined minimum capacitor voltage. The processor 120 may adjust operation of the illumination unit 130 and/or the imaging unit 140 to provide additional time for the storage capacitor 115 to recharge. Additionally, the processor may adjust operation of the illumination unit 130 and/or the imaging unit 140 to provide illumination according to eye safety standards. For example, the processor 120 may control the illumination unit 130 and/or the imaging unit 140 to operate a slower frame rate, operate at a lower current and/or operate with a short pulse duration to provide eye safe operation. Similarly, the processor 120 may adjust the illumination cycle and/or pulse to bypass additional LEDs 132 of the illumination unit 130 to provide eye safe operation during scanning.

The processor 120 may also include an input/output (I/O) port for exchanging data with operator device 150. To this end, the operator device 150 may control operation of the industrial environment that includes the illumination system 100. For example, the operator device 150 may be a workstation computer, a laptop, a mobile phone, or any other computing device permitted to control operation of the industrial environment and/or the illumination system 100. Accordingly, the operator device 150 may include an illumination design application that enables the operator to design illumination cycles that are executed by the illumination system 100. For example, if the illumination system 100 is a part of a production line for an object, the illumination cycle may configure the illumination unit 130 to provide different lighting conditions to detect different features of the object passing in front of the imaging unit 140. The operator device 150 may convert the illumination design into a set of illumination control instructions that are downloaded into the processor 120 via the I/O port. Accordingly, the processor 120 may configure the illumination unit 130 (and/or the various switches thereof) in accordance with the illumination control instructions. The operator device 150 may allow for an operator to provide desired parameter values for illumination including, without limitation, a desired electrical current to the LEDs, desired number of LEDs for providing illumination, specified LEDs for providing illumination, desired illumination pulse time, illumination pulse period, illumination on time, etc.

Additionally, the processor 120 may send data to the operator device 150 via the I/O port. For example, the memory 134 of the illumination unit 130 may include information about the physical and/or logical location of the LEDs 132. Accordingly, the illumination design application may present an interface the depicts the layout of the LEDs 132 for improved design control and/or simulation. As another example, the memory 134 may include a model number for the illumination unit 130. Accordingly, the illumination design application may query an illumination unit database (not depicted) to determine the location of the LED. As another example, the processor 120 may obtain a maximum current rating for the LEDs 132 from the memory 134 to provide to the operator device 150. The processor 120 may obtain one or more eye safe parameter values from the memory 134 for providing eye safe illumination. Accordingly, the illumination design application may be configured to simulate the control instructions before downloading them to the processor 120 to ensure compliance with the maximum current ratings.

Figure 2:
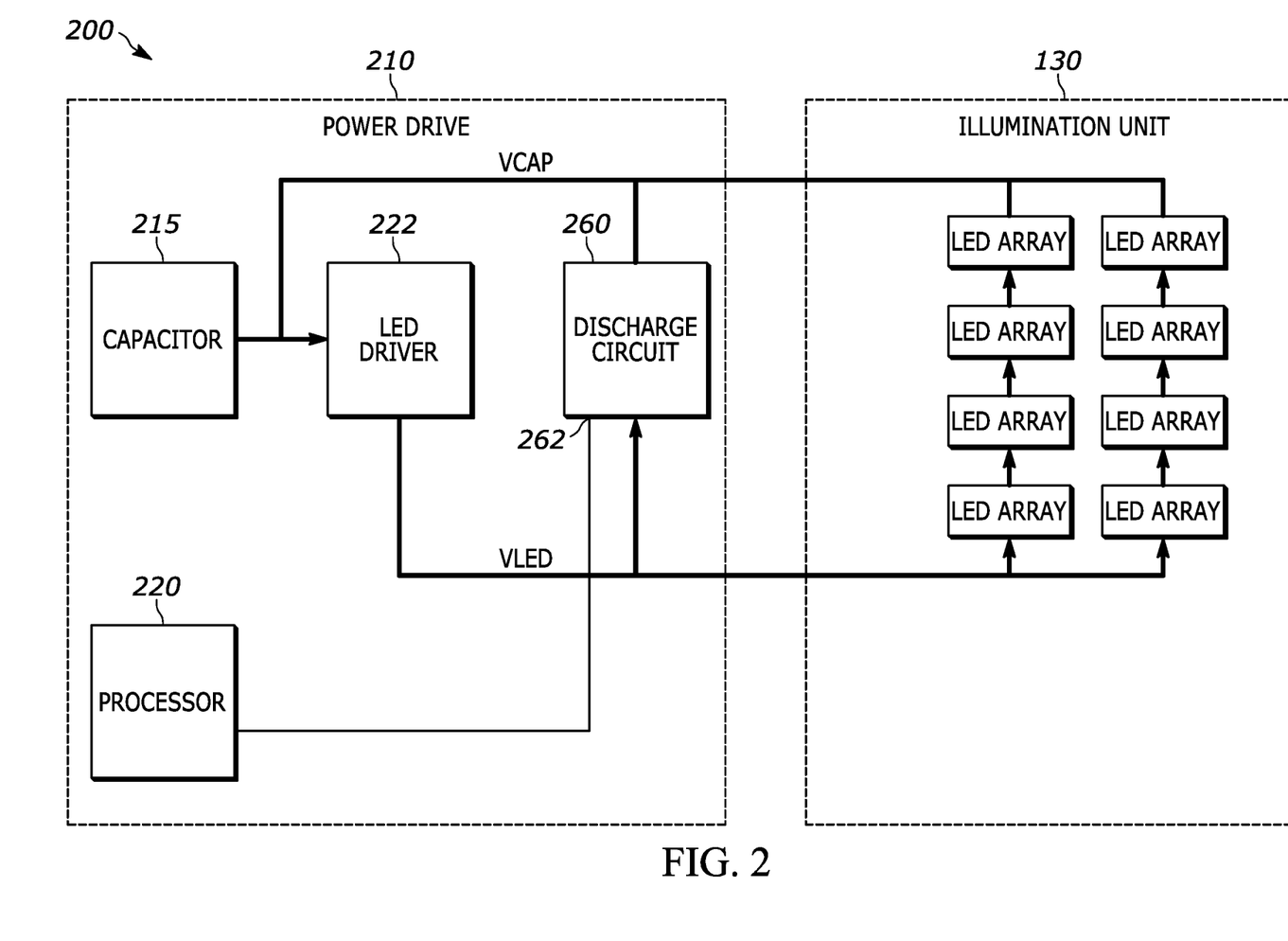
FIG. 2 illustrates an example illumination system that includes LED arrays as illumination elements.

Turning now to FIG. 2, illustrated is an example illumination system 200 that is a modification of the illumination system 100. In particular, the example illumination system 200 includes a power drive 210 that includes an active discharge circuit 260. The power drive 210 also includes a capacitor 215, a LED driver 222 a processor 220, which may be the storage capacitor 115, the LED driver 122, and the processor 120 of FIG. 1, respectively.

The active discharge circuit 260 may be configured to discharge the LED voltage (VLED) to the capacitor voltage (VCAP) to ensure eye safe operation of the illumination unit 130. To this end, the processor 220 may be configured to control the illumination unit 130 to provide consecutive illumination pulses with different configurations of the LEDs 132. Accordingly, if the voltage required to drive the LEDs 132 to provide eye safe illumination decreases between consecutive illumination pulses, the initial, higher illumination voltage may not be sufficiently discharged below the voltage level to provide eye safe illumination for the next, lower illumination pulse. For example, the next, lower illumination pulse may enable fewer LEDs 132 and/or operate the LEDs at a different color that requires less power (e.g., red vs. white illumination) and/or has different eye safety standard values. This excess voltage may damage the LEDs 132, or cause unsafe illumination for a user or operator, when executing the lower illumination pulse. By actively discharging the excess voltage, the active discharge circuit 262 ensures safe operation of the illumination unit 130.

As illustrated, the active discharge circuit 260 includes an input port 262 that enables the processor 220 to activate the active discharge circuit 260. For example, by sending a control signal to the input port 262, the processor 220 closes a switch (not depicted) to cause current supplied by the LED driver 222 to flow into the active discharge circuit 260 instead of the illumination unit 130 (via an illumination port, such as the illumination port 119 of FIG. 1) while the capacitor 215 is recharging. Thus, the processor 220 may be configured to analyze illumination control instructions stored thereat to detect when voltage required for consecutive illumination pulses decreases and accordingly control the discharge circuit 260 via the input port 262.

Figure 3A:
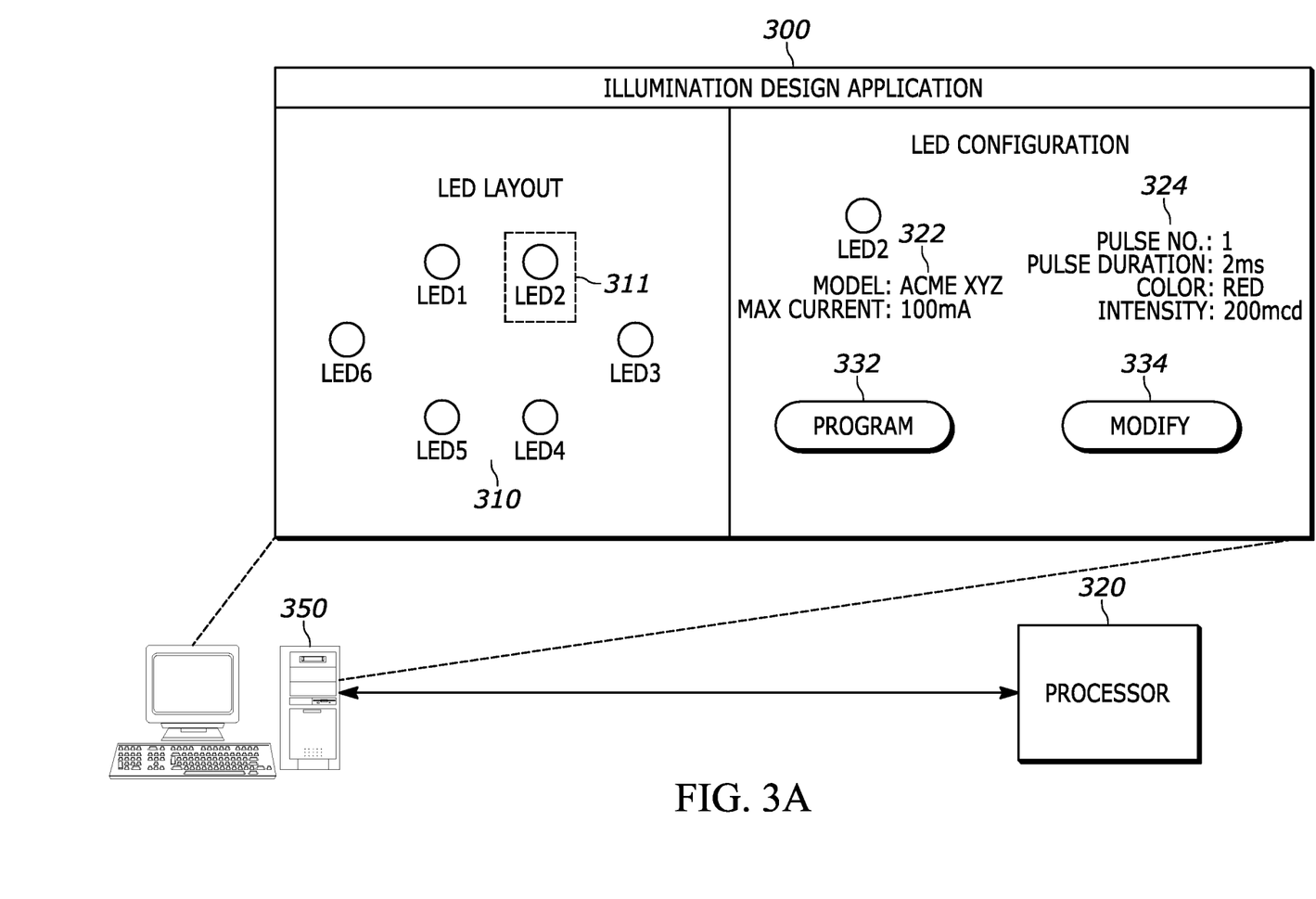
FIG. 3A illustrates an example user interface for an illumination design application.

Turning to FIG. 3A, illustrated an example user interface 300 for an illumination design application executing on an operator device 350 (such as the operator device 150 of FIG. 1). The operator device may be connected to an I/O port of a processor 320 (such as the processor 120 of FIG. 1, the processor 220 of FIG. 2A, and/or another similarly configured logic circuit). As described above, the illumination design application may be configured to enable an operator to design a set of illumination control instructions indicative of an illumination cycle performed by an illumination unit (such as the illumination unit 130 of FIGS. 1 and 2).

The illumination design application may be configured to poll the processor 320 for information to populate the user interface 300. For example, the illumination design application may be configured to obtain an LED layout from the processor 320 to present a visual indication 310 thereof. In some embodiments, the indication of the LED layout 310 may also indicate the position of the LEDs relative to an object of interest. The indication representative of the individual LEDs in the LED layout 310 may be selectable to present corresponding LED configuration panel.

As illustrated, the LED configuration panel may include static information 322 describing the selected LED and programmable information 324. The illumination design application may obtain the displayed information from the processor 320. Accordingly, the operator may modify the programmable information 324 by selecting an interface element 334 and inputting values for the respective programmable fields. It should be appreciated that if the operator modifies the pulse number field, the user interface 310 may obtain new information corresponding to the new pulse. Accordingly, the operator is able to design illumination cycles that include any number of pulses via the user interface 300.

Figure 3B:
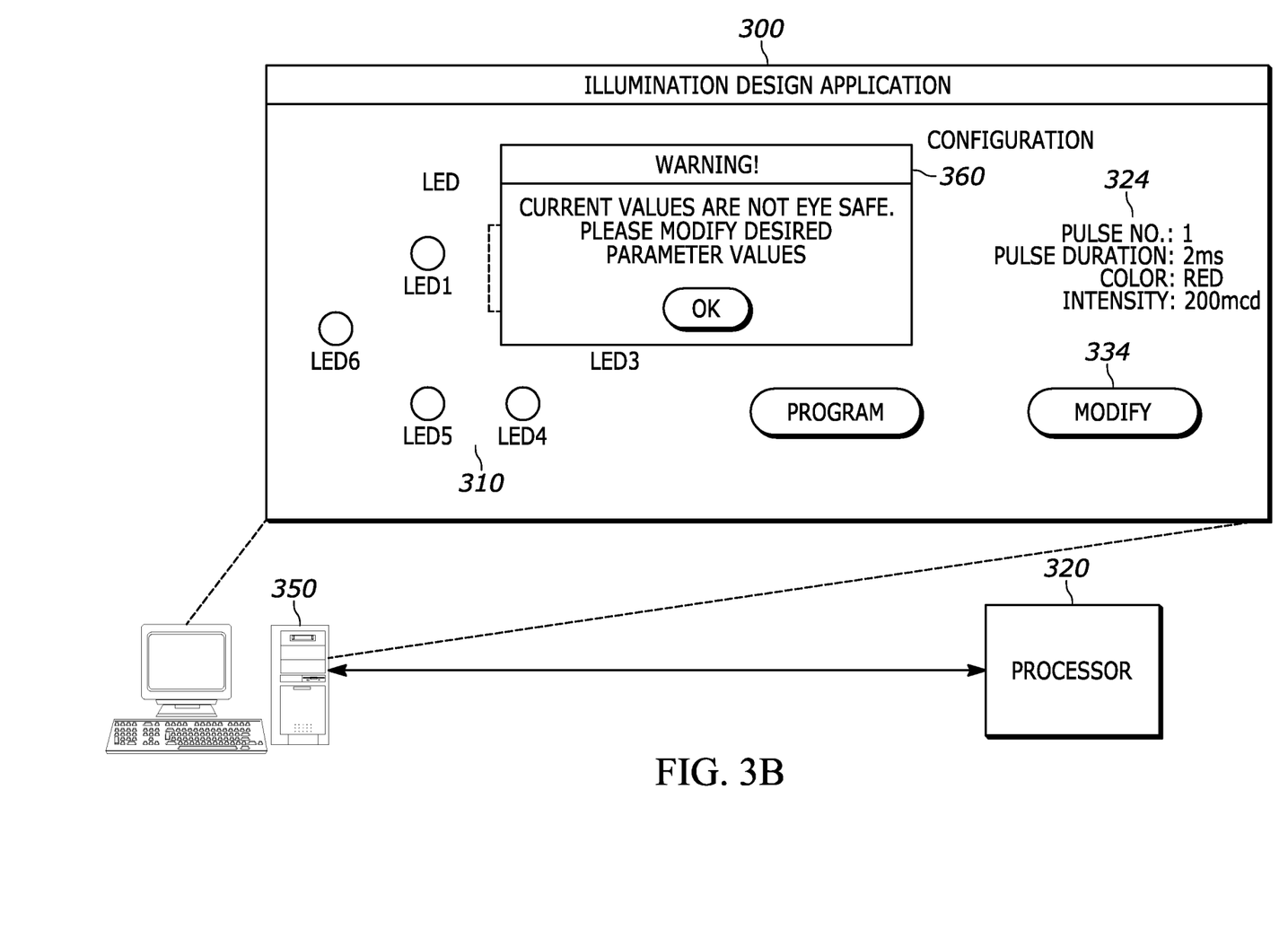
FIG. 3B illustrates an example user interface for an illumination design application presenting an eye safety warning notification.

When the operator finishes designing the illumination cycle, the operator may interact with a user element 332 to program the processor 320 with a set of illumination control instructions corresponding to the designed illumination cycle. After receiving the set of control instructions, the processor 320 may control one or more switches of the illumination unit and/or program the LEDs accordingly. In some embodiments, prior to downloading the set of illumination control instructions into the processor 320, the illumination design application performs a simulation of the illumination cycle to determine compliance with operational limits of the LEDs, such as a maximum current. Accordingly, if the simulated illumination cycle does not perform within the operational limits, the illumination design application may present a warning to the operator. The warning may indicate the particular LED that would not comply with the operational limit and provide an indication of how to adjust the illumination cycle accordingly. Additionally, the illumination design application determines whether the input illumination cycle performs according to eye safety standards. If the simulated illumination cycle does not perform within the operational limits, the illumination design application may present a warning to the operator. FIG. 3B illustrates the illumination design application presenting a warning notification 360 that informs an operator that current desired parameter values are not eye safe, and that the user should input new parameter values to provide illumination according to eye safety standards. The illumination design application may determine whether a desired input pulse duration, intensity of illumination, pulse train duty cycle, LED drive current is eye safe or not. In embodiments that employ multiple color LEDs 132 or illumination elements, the desired input may be a desired color, or colors, of illumination. As such, the illumination design application may also include interfaces for a user to input desired colors, or sets of colors. For example, a user may input a desired illumination wavelength, or band of illumination wavelengths, as the desired input.

Figure 4:
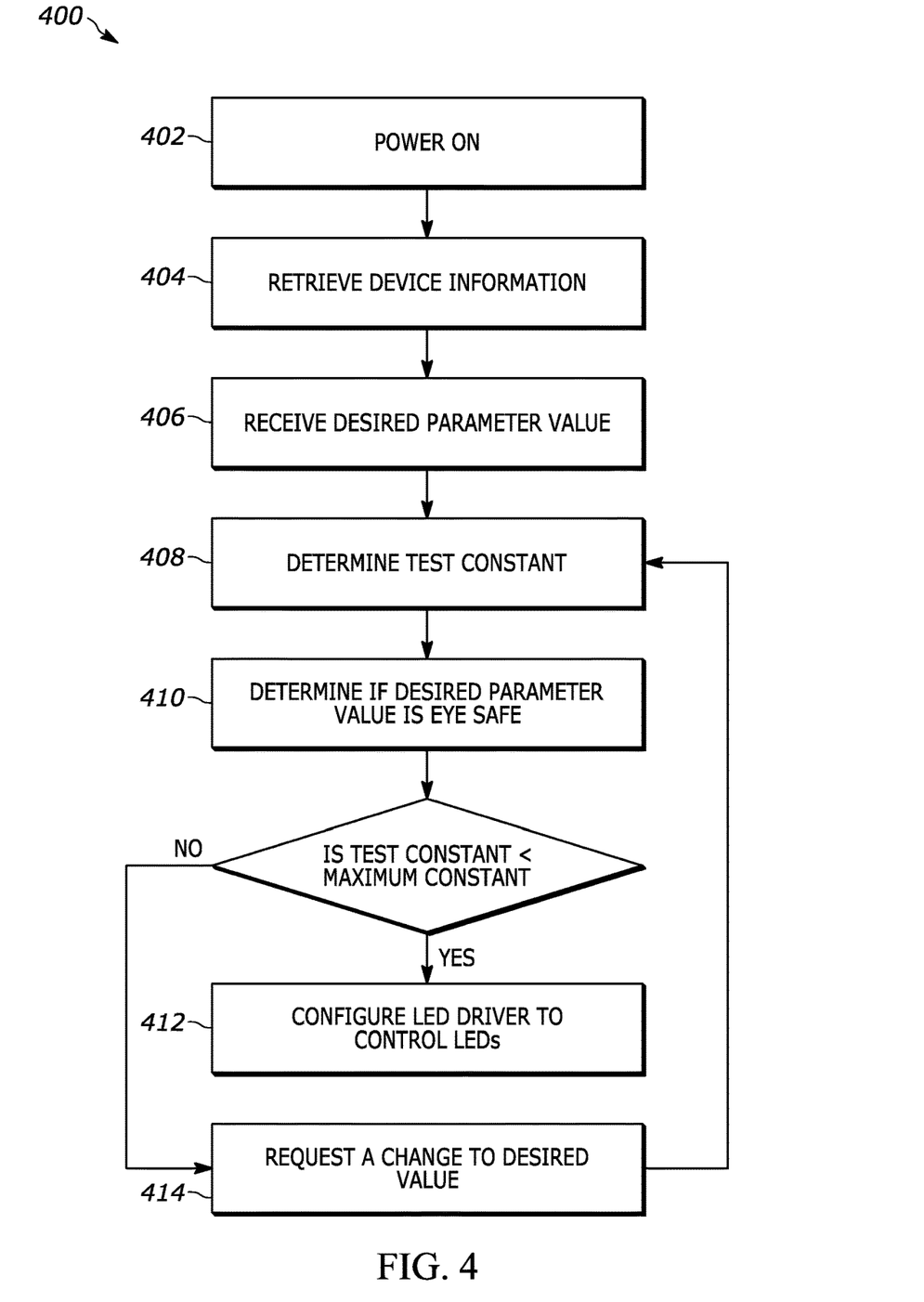
FIG. 4 is a flow diagram of a method for performing eye safe illumination as disclosed herein.

FIG. 4 is a flow diagram of a method 400 for controlling illumination according to eye safety standards. The flow diagram may be performed by a processor of an illumination system (such as the processor 120, 220, or 320 or FIGS. 1, 2, and 3, respectively, and/or another similarly configured logic circuit). As an example, the method 400 of FIG. 4 will be further described with reference to elements of FIG. 1.

At block 402, the processor 120 is powered on. More particularly, the processor 120 may be connected to a power supply (such as the power supply 105 of FIG. 1, such as by closing a switch associated with the power supply.

At block 404, the processor 120 accesses memory 134 of the illumination unit 130 and retrieves device information indicative of properties of the illumination unit 130. The retrieved device information includes a plurality of parameters of one or more illumination elements of the illumination module. Such illumination elements may include one or more LEDs such as the LEDs 132. The device information may include a category voltage for the LEDs 132, a category current for the LEDs 132, a category temperature for the LEDs 132, a number of LEDs 132, an LED color for the LEDs 132, an LED binning for the LEDs 132, an LED grouping arrangement (e.g., a logical positioning of the LEDs 132 in terms of bank and group numbering), a physical arrangement (e.g., a physical location of the LEDs 132 on the illumination unit 130), relative locations of the LEDs 132 to each other, an LED part number, a physical position and/or orientation of one or more of the LEDs on a circuit board, an eye safe current each of the LEDs 132, an eye safe power to provide to each of the LEDs 132, an eye safe illumination output of each of the LEDs 132, a circuit board identification number, a circuit board type, sensor information (i.e., temperature or other types of sensors), a model number for the illumination unit 130, and/or other information about the illumination unit 130 and/or the LEDs 132.

The device information also includes a maximum constant for at least one illumination element (e.g., for an LED). The maximum constant is indicative of a relationship between at least two parameters of the illumination element. Further, the maximum constant is indicative of eye safe operation of the illumination unit 130, or a radiation risk group. For example, the eye safety standard employed by the system 100 may be according to the standards and parameter values set forth in the International Standard IEC 62471: 2006 (Ed.1), of EN 62471:2008. Other eye safety standards may be used, or eye safety standards that are updated over time may also be used. The memory 134 may store values and parameter limits according to the eye safety standards, and the maximum constant is indicative or one or more of the parameter limits.

The maximum constant may be indicative of a proportional relationship between an LED driving electrical current, and an illumination pulse duration of an LED. For example, an equation may be derived to determine the maximum constant such as $$K=I*t/T,\qquad\text{EQ. 1}$$

where K is the eye safety maximum constant, I is LED driving current, t is the duration of an illumination pulse, and T is the inverse of the frame rate of a camera such as the image sensor 142. K is a constant value, and the frame rate of a system may also be a constant or set value, while both the pulse duration and driving current may be changed according to a desired illumination. While driving current and pulse duration are used in the current example, the maximum constant may be indicative of a relationship between other illumination and device parameters such as between any of an electrical driving current, an illumination output power, luminous intensity (i.e., candelas), luminous flux (i.e. lumens), or an overall total illumination time that an LED may provide illumination, among other operational parameters for providing illumination.

At block 406, the method includes receiving, from a user, a desired parameter value for one of the parameters of the plurality of parameters. Using the current example, the user may input a desired illumination pulse duration value.

At block 408, the processor 120 determines a test constant based on the desired parameter value. The test constant is a value for K, referred to herein as $K_{test}$, that may be used to determine if the input desired parameter value is within eye safety standards. For example, a current of 2 mA may be required to power an LED, the frame rate of a sensor may be 60 frames per second resulting in a value of T=1/60, and a user may input a desired parameter value of 2 ms for the pulse duration. This results in a test constant value of $K_{test}=0.066$.

At block 410, the processor 120 compares the test constant and the maximum constant to determine if the desired parameter value is an acceptable value according to eye safety standards. For example, the maximum constant K for a given illumination unit, or specific illumination device such as a green LED, may be a value of 0.1. In the current example, the user input a desired value of 2 ms for pulse duration, which results in a test constant of 0.066, which is less than the maximum constant of 0.1. Therefore, the processor 120 compares the test constant and the maximum constant and determines that the desired input parameter value of 2 ms pulse duration is within eye safety standards and is an acceptable value. If the user then changes the desired input value to a 4 ms pulse duration, the test constant would be 0.13. At block 410 the processor 120 would compare the test constant and the maximum constant and determine that the test constant exceeds the maximum constant and that the desired parameter value of 4 ms is not eye safe and is therefore not an acceptable value.

While described here as comparing the maximum constant and the test constant, the processor 120 may further determine an acceptable value of the desired input value, and compare the desired input value with the determined acceptable value of that parameter. For example, the processor 120 may determine, from the maximum constant, that the maximum current to be provided to an LED is 2 mA, the user may input a desired parameter value of 2.5 mA, and the processor 120 may compare those two values to determine eye safe operation during an illumination cycle. As another example, the desired parameter value may be a desired illumination value. The processor 120 may then determine the test constant as a test illumination time, and the plurality of parameters of the illumination element includes a total illumination time indicative of an amount of time that the illumination element may provide illumination over a given period of time. The processor 120 then determines the test illumination time from the desired illumination value and the maximum constant. The processor 120 compares the test illumination time and the total illumination time and determines that the desired illumination value is an acceptable illumination value if the test illumination time is equal to or less than the total illumination time, or that the desired illumination value is not an acceptable illumination value if the test illumination time is greater than the total illumination time. Further, the desired parameter value may be a desired illumination time, and the described method may be performed by determining a test constant as a test illumination amount and comparing a test illumination amount with a maximum allowed illumination amount.

If the processor 120 determines that the desired parameter value is not within eye safety standards, then the processor 120 may provide an indication to a user or operator. For example, the processor 120 may provide a notification via the illumination design application 300 indicating that the current set of parameter values is not eye safe. At block 414 the method includes requesting a new desired parameter value. For example, the processor 120 may provide a notification that a lower pulse time duration is required to perform within eye safety standards. A user may then input another value via the operator device 150 and the method 400 may then recalculate a new test constant and determine if the new desired parameter value is within eye safety standards.

In examples, the user may decide not to change the desired parameter to a value that is eye safe. In such instances, the processor 120 will either shorten the length of a pulse (e.g. for a global shutter sensor) or reduce the current provided to illumination elements, such as the LEDs 132 (e.g., for a rolling shutter sensor). The processor 120 may provide the altered parameter values upon execution of an illumination cycle, or may alter the value and notify an operator via the operator device 150.

Alternatively, if the processor 120 determines that the desired parameter is within eye safety standards, at block 412, the processor 120 configures an LED driver (such as the LED drivers 122 and 222 of FIGS. 1 and 2, respectively) to provide the driving current according to the determined eye safe pulse duration. To this end, the processor 120 may send a control signal to an input port of the LED driver that controls the LED driver to use the desired parameter values as a current output to the LEDs.

The processor 120 may further be in direction control of the LED banks to control the LED banks according to the determined eye safe parameters. The processor 120 may configured the LEDs in accordance with the determined eye safe illumination cycle. To this end, the processor may output a set of control instructions over one or more GPIO ports to control switches associated with the LED banks and/or grouping of LEDs within the LED banks. For example, the processor may transmit control signals over the GPIO ports that implement multiplexing techniques to signal the control state for the switches of the LED banks and/or LED groupings. Additionally, the illumination unit 130 may include color-programmable LEDs, the processor may be configured to set the LED color for the LEDs as well. After setting the switches of the illumination unit and the LED colors, the processor may close a switch to connect the illumination unit to the LED driver. Additionally, the color of an LED may change the eye safe driving current, illumination pulse duration, pulse train period, or other values of a given LED. Therefore, the method 400 of FIG. 4 may be performed each time a user changes the desired color of an LED to determine if the illumination cycle parameters are eye safe for a given color of an LED.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The claims are:

1. A method for controlling illumination, the method comprising:

retrieving, by a processor and from a memory of an illumination module, device information indicative of properties of the illumination module, wherein the device information includes (i) a plurality of parameters of an illumination element of the illumination module and (ii) a maximum constant for the illumination element, the maximum constant indicative of a relationship between at least two parameters of the illumination element;
receiving, from a user, a desired parameter value for one of the parameters of the plurality of parameters;
determining, by the processor, a test constant from the desired parameter value;
determining, by the processor, and from the test constant and maximum constant, that the desired parameter value is an acceptable parameter value; and
controlling, by the processor, a power source to provide electrical current to the illumination module according to the desired parameter value.

2. The method of claim 1, wherein the maximum constant is indicative of a proportional relationship between an electrical current of the illumination element, and an output illumination provided by the illumination element, and wherein the test constant is indicative of one of (i) a desired electrical current of the illumination element, or (ii) an output illumination provided by the illumination element.

3. The method of claim 1, wherein determining that the desired parameter value is an acceptable parameter value comprises:
comparing, by the processor, the test constant and the maximum constant; and
determining, by the processor, that the desired parameter value is an acceptable parameter value when the test constant is equal to or less than the maximum constant, or that the desired parameter value is not an acceptable parameter value when the test constant is greater than the maximum constant.

4. The method of claim 1, wherein the desired parameter value is a desired illumination value, the test constant is a test illumination time and the plurality of parameters of the illumination element includes a total illumination time indicative of an amount of time that the illumination element may provide illumination over a given period of time, and wherein the method further comprises:
determining, by the processor, a test illumination time from the desired illumination value and the maximum constant;
comparing, by the processor, the test illumination time and the total illumination time; and
determining, by the processor, that the desired illumination value is an acceptable illumination value when the test illumination time is equal to or less than the total illumination time, or that the desired illumination value is not an acceptable illumination value when the test illumination time is greater than the total illumination time.

5. The method of claim 1, wherein the desired parameter value is a desired illumination time, the test constant is a test illumination value and the plurality of parameters of the illumination element includes a maximum illumination value indicative of an amount of illumination that the illumination element may provide, and wherein the method further comprises:
determining, by the processor, a test illumination value from the desired illumination time and the maximum constant;
comparing, by the processor, the test illumination value and the maximum illumination value; and
determining, by the processor, that the desired illumination time is an acceptable illumination time when the test illumination value is equal to or less than the maximum illumination value, or that the desired illumination time is not an acceptable illumination time when the test illumination value is greater than the value illumination value.

6. The method of claim 1, wherein the illumination module comprises one or more light emitting diodes (LEDs).

7. The method of claim 1 wherein the device information includes at least one of a circuit board identification, one or more light emitting diode (LED) properties, a circuit board type, identifications of sensor types of the illumination module, an illumination module identification.

8. The method of claim 7, wherein the one or more LED properties includes a color of an LED, a physical grouping of LEDs, relative locations of LEDs to each other, locations of LEDs on a circuit board, an LED part number, a maximum current for an LED, a number of LEDs, a physical position of an LED on the illumination module, and a physical orientation of an LED on the illumination module.

9. The method of claim 1, wherein the maximum constant is further indicative of a radiation risk group classification.

10. The method of claim 1, further comprising determining, by the processor, a maximum value of another parameter from the desired parameter value and the maximum constant.

11. An illumination system comprising:
an illumination port adapted to receive an illumination module having (i) one or more illumination elements, and (ii) a memory storing device information indicative of the illumination module, wherein the device information includes (i) a plurality of parameters of an illumination element of the illumination module and (ii) a maximum constant for the illumination element, the maximum constant indicative of a relationship between at least two parameters of the illumination element;
processor operatively connected to the illumination port, the processor configured to:
retrieve the device information from the memory of the illumination module;
receive, at a user interface, a desired parameter value for one of the parameters of the plurality of parameters;
determine a test constant from the desired parameter value;
determine, from the test constant and maximum constant, that the desired parameter value is an acceptable parameter value; and
control a power source to provide electrical current to the illumination module according to the desired parameter value.

12. The illumination system of claim 11, wherein the illumination module is selectively removable from the illumination system.

13. The illumination system of claim 11, wherein the maximum constant is indicative of a proportional relationship between an electrical current of the illumination element, and an output illumination provided by the illumination element, and wherein the test constant is indicative of one of (i) a desired electrical current of the illumination element, or (ii) an output illumination provided by the illumination element.

14. The illumination system of claim 11, wherein to determine that the desired parameter value is an acceptable parameter value the processor is further configured to:
compare the test constant and the maximum constant; and
determine that the desired parameter value is an acceptable parameter value when the test constant is equal to or less than the maximum constant, or that the desired parameter value is not an acceptable parameter value when the test constant is greater than the maximum constant.

15. The illumination system of claim 11, wherein the desired parameter value is a desired illumination value, the test constant is a test illumination time and the plurality of parameters of the illumination element includes a total illumination time indicative of an amount of time that the illumination element may provide illumination over a given period of time, and wherein the to determine that the desired parameter value is an acceptable parameter value the processor is further configured to:
  determine a test illumination time from the desired illumination value and the maximum constant;
  compare the test illumination time and the total illumination time; and
  determine that the desired illumination value is an acceptable illumination value when the test illumination time is equal to or greater than the total illumination time, or that the desired illumination value is not an acceptable illumination value when the test illumination time is less than the total illumination time.

16. The illumination system of claim 11, wherein the desired parameter value is a desired illumination time, the test constant is a test illumination value and the plurality of parameters of the illumination element includes a maximum illumination value indicative of an amount of illumination that the illumination element may provide, and wherein to determine that the desired parameter value is an acceptable parameter value the processor is further configured to:
  determine a test illumination value from the desired illumination time and the maximum constant;
  compare the test illumination value and the maximum illumination value; and
  determine that the desired illumination time is an acceptable illumination time when the test illumination value is equal to or greater than the maximum illumination value, or that the desired illumination time is not an acceptable illumination time when the test illumination value is less than the value illumination value.

17. The illumination system of claim 11, wherein the illumination module comprises one or more light emitting diodes (LEDs).

18. The illumination system of claim 11, wherein the device information includes at least one of a circuit board identification, one or more light emitting diode (LED) properties, a circuit board type, identifications of sensor types of the illumination module, an illumination module identification.

19. The illumination system of claim 18, wherein the one or more LED properties includes a color of an LED, a physical grouping of LEDs, relative locations of LEDs to each other, locations of LEDs on a circuit board, an LED part number, a maximum current for an LED, a number of LEDs, a physical position of an LED on the illumination module, a physical orientation of an LED on the illumination module.

20. The illumination system of claim 11, wherein the maximum constant is further indicative of a radiation risk group classification.

21. The illumination system of claim 11, wherein the processor is further configured to determine a maximum value of another parameter from the desired parameter value and the maximum constant.

* * * * *